United States Patent [19]
Kohut

[11] Patent Number: 5,153,155
[45] Date of Patent: * Oct. 6, 1992

[54] CLAY SLURRY

[75] Inventor: William Kohut, Springville, Tenn.

[73] Assignee: H. C. Spinks Clay Company Inc., Paris, Tenn.

[*] Notice: The portion of the term of this patent subsequent to Nov. 14, 2006 has been disclaimed.

[21] Appl. No.: 622,851

[22] Filed: Dec. 6, 1990

[51] Int. Cl.$^5$ .............................................. C04B 33/04
[52] U.S. Cl. .................................... 501/141; 501/143; 501/144; 501/148
[58] Field of Search ................ 501/141, 143, 144, 148

[56] References Cited

U.S. PATENT DOCUMENTS

| | | | |
|---|---|---|---|
| 1,856,613 | 5/1932 | Ackermann | 501/141 |
| 2,337,597 | 12/1943 | Hall | 501/147 |
| 2,635,058 | 4/1953 | Woodridge | 501/144 |
| 3,130,063 | 4/1964 | Millman et al. | 501/148 |
| 3,594,203 | 7/1971 | Sawyer et al. | 501/148 |
| 3,759,726 | 9/1973 | Wittels | 501/143 |
| 4,106,949 | 8/1978 | Malden | 501/148 |
| 4,517,098 | 5/1985 | Hann et al. | 501/148 |
| 4,738,726 | 4/1988 | Pratt et al. | 501/148 |
| 4,741,838 | 5/1988 | Sharpe, Jr. | 501/148 |
| 4,880,759 | 11/1989 | Kohut | 501/148 |
| 4,916,094 | 4/1990 | Salinas | 501/148 |

*Primary Examiner*—Karl Group
*Assistant Examiner*—Sue Hollenbeck
*Attorney, Agent, or Firm*—Howard J. Greenwald

[57] ABSTRACT

A slurry composition which may be used to produce a casting slip is provided. The slurry is made by blending a ball clay/water mixture together with a separate mixture of clay and water.

The blended slurry thus produced contains from about 0.01 to about 1.0 weight percent of polyelectrolyte. When this blended slurry is mixed with from 40 to 55 parts of nonplastic material (such as flint), a casting slip is produced.

6 Claims, 1 Drawing Sheet

CLAY SLURRY

FIELD OF THE INVENTION

A clay/water slurry which, after being mixed with non-plastic material, may be used as casting slip.

BACKGROUND OF THE INVENTION

Slip casting is a process in which a low viscosity, high solids slip is dewatered in a plaster mold.

The properties of the casting slip, and the properties of the bodies formed from it, will vary with such factors as the particle size distribution of the materials in the slip, the chemical nature(s) of the materials in the slip, the surface area of such materials, and the like. Even a minor change in the physical or chemical properties of one of the components of the slip may substantially affect the properties of the slip.

Many of the prior art casting slips have been made by blending ball clay, kaolin clay, non-plastics, and water. Thus, for example, a porcelain casting slip frequently was prepared by blending from about 25 to about 39 parts of ball clay, from about 11 to about 25 parts of kaolin clay and from about 40 to about 55 parts of non-plastic material.

In general, relatively unsophisticated equipment and workers were used to prepared the casting slips. The materials often were charged into a tank equipped with a mixer. Often one worker would insert a stick into the tank while another worker would fill the tank to a specified stick height with one or more of the reagents. Needless to say, this practice did not produce casting slips whose properties were substantially constant from batch to batch.

In order to make the process of preparing the casting slip easier to use, applicant invented a ball clay slurry. This slurry, which is described in applicant's U.S. Pat. Nos. 4,812,487, 4,812,428, and 4,880,759, provided the manufacturer of the casting slip with a material whose properties were substantially identical from batch to batch.

Although the ball clay slurry described in applicant's patents substantially simplified the casting slip process, it still was necessary to mix this slurry with kaolin clay (in either slurry and/or powder form) and with non-plastic material. Although the opportunity for operator error was substantially reduced with the use of applicant's slurry, many errors could still be (and were) made by the operators.

In his prior patents, applicant broadly described a mixture of a ball clay slurry and a kaolin clay slurry; see, for example, columns 33–35 of U.S. Pat. No. 4,880,759. Thus, in said U.S. patent, it is disclosed that the weight/weight ratio of the ball clay and the kaolin clay in the slurry may range from 0.11 to 9.

Many thousands of mixtures of ball clay and kaolin clay are described in U.S. Pat. No. 4,880,759. Many of these mixtures, however, do not possess the required combination of properties needed to prepare a commercially acceptable casting slip.

As is disclosed in U.S. Pat. No. 4,880,759, slip casting is the process in which a low viscosity, high solids content slip is dewatered in a plaster mold. This dewatering must be accompanied by a simultaneous gellation of the colloidal fraction of the particles within the body. These two processes, dewatering and gellation, re both necessary and, in some slips, are frequently opposed to each other. They perform separate functions and, only when balanced in exactly the correct relationship, do they together provide optimum casting behavior.

It is an object of this invention to provide a clay slurry whose unique combination of properties make it suitable for mixing with non-plastic material to produce a casting slip with a commercially acceptable properties.

It is another object of this invention to provide a clay slurry which, when mixed with non-plastic material, forms a slip which may be used to prepare bodies with improved strength properties.

It is another object of this invention to provide a process for making a novel clay slurry.

SUMMARY OF THE INVENTION

In accordance with this invention, there is provided a clay/water slurry comprised of from about 58 to about 72 weight percent of clay and from about 0.01 to about 1 weight percent of a polyelectrolyte.

BRIEF DESCRIPTION OF THE DRAWING

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
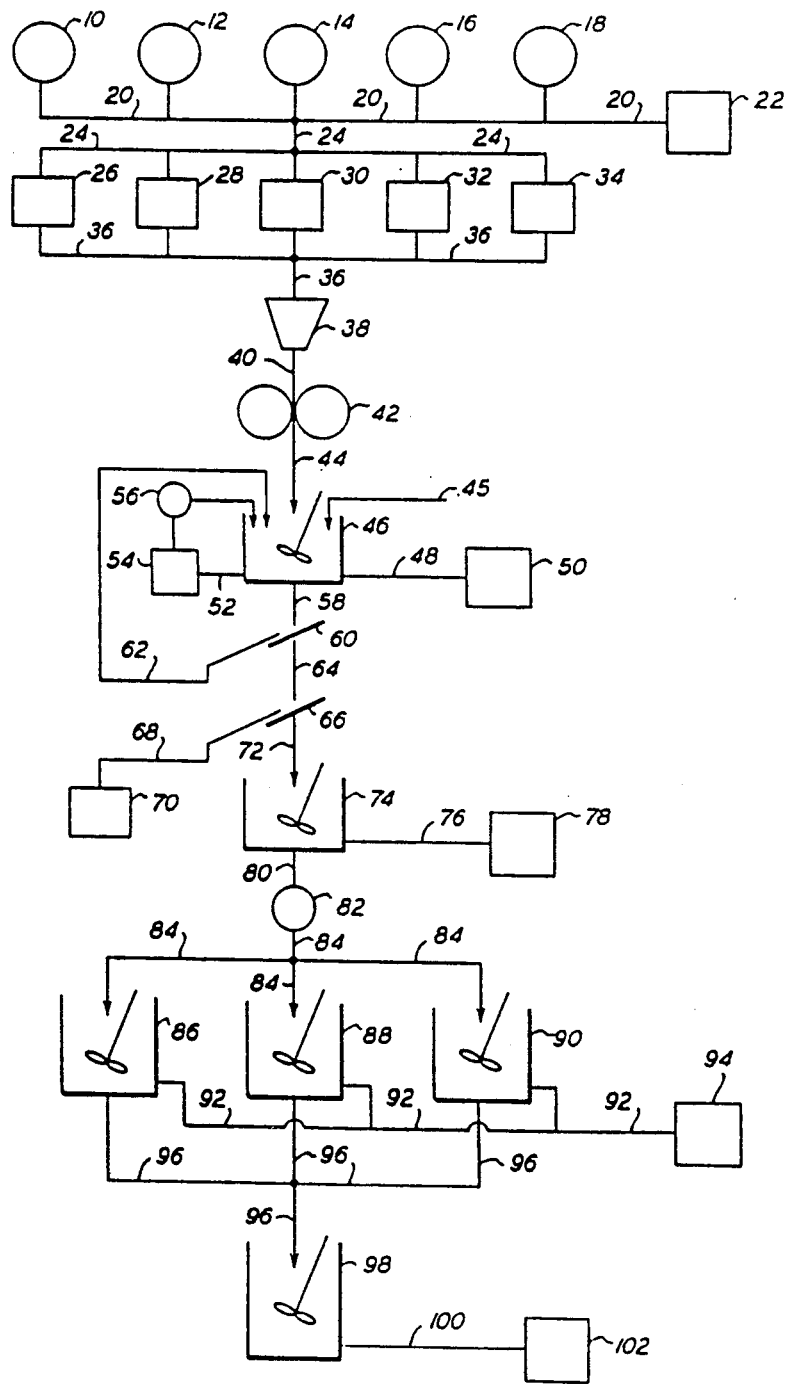
FIG. 1 is a flow sheet illustrating one preferred process of applicant's invention.

Applicant has discovered a unique clay which, when blended with from about 0.01 to about 1.0 weight percent of organic polyelectrolyte and water, and ball clay slurry, produces a slurry which can make a suitable casting slip upon the addition of only non-plastic material to it.

The clay initially used in the process of this invention has a specified particle size. Means for measuring a particle size distribution are described in U.S. Pat. No. 4,416,666 of James E. Funk, the disclosure of which is hereby incorporated by reference into this specification.

As is known to those skilled in the art, the particle size distribution of a clay may be measured in accordance with the following methods:

1. In view of the manner in which clay particles fracture, they will have irregular shapes which, however, are of a body (or maximum side-to-side thickness) such that subsieve sized discrete particles will pass through a specified mesh of a sieve. The size of the discrete particles can be expressed in terms of a spherical diameter through which a dry particle from a sample of clay or clay/water slurry will pass. One can use U.S. Series sieves down to about 270 mesh (53 microns).

2. A Micromeritics Sedigraph Model 5100 (made by the Micromeritics Company, Norcross, Ga.) may be used to measure the particle size distribution in a clay/water slurry. A 0.3 percent solution of "LOMAR D" (the sodium salt of a condensed mono naphthalene sulfonic acid sold by the Diamond Shamrock Chemical Company of Morristown, N.J.) can be used. The solution is made by weighing 3.0 grams of "LOMAR D" and placing it in a one-liter flask; the flask is then filled up to the mark with distilled water. Approximately 4 grams of the clay to be tested (dry weight) is placed in 50 milliliters of the dilute "LOMAR D" solution and mixed in an English microcup for ten minutes. The slurry is then cooled to 32 degrees Celsius and pumped into the Sedigraph for analysis.

3. Specific surface area can be measured by nitrogen adsorption using the well known BET equation. This measurement can be conducted on a Micromeritics "Flow Sorb II 2300," model 2300/00000/00 (made by Micromeritics Company). The test procedure is described in the instruction manual for the machine (see, e.g., Manual P/N: 230/42804/00, published by Micromeritics in 1985).

4. Wet sieve analysis of ball clay may be conducted in accordance with A.S.T.M. test C-325-81.

The clay initially used in applicant's process has a particle size distribution such that from about 25 to about 50 percent (by weight of the dry clay) are smaller than 0.5 microns. As used in this specification, the term dry clay refers to a clay which contains less than 0.1 weight percent of moisture. The moisture content of a clay may be determined by a test in which 500 grams of clay is weighed, it is then dried for at least 12 hours at a temperature of 105 degrees Centigrade, and it is weighed again.

In one embodiment, The clay initailly used in applicant's process has a particle size distribution such that from about 35 to about 50 percent (by weight of the dry clay) are smaller than 0.5 microns.

The clay initially used in applicant's process has a particle size distribution such that from about 60 to about 85 percent (by weight of the dry clay) are smaller than 2.0 microns.

In one embodiment, The clay initially used in applicant's process has a particle size distribution such that from about 65 to about 80 percent (by weight of the dry clay) are smaller than 2.0 microns.

The clay used in applicant's process has a particle size distribution such that from about 70 to about 97 percent (by weight of the dry clay) are smaller than 5.0 microns.

In one embodiment, The clay used in applicant's process has a particle size distribution such that from about 80 to about 97 percent (by weight of the dry clay) are smaller than 5.0 microns.

The clay initially used in applicant's process of invention is comprised of from about 30 to about 50 weight percent of silica, by weight of dry clay. As is known to those skilled in the art, silica is a polymorphic substance with the formula $SiO_2$. See, e.g., pages 14-26 of W. E. Worrall's "Clays and Ceramic Raw Materials," Second Edition (Elsevier Applied Science Publishers, New York, 1986), the disclosure of which is hereby incorporated by reference into this specification.

The silica content of the clay is determined by standard elemental oxide analysis for clays, using atomic absorption analysis.

The atomic absorption analysis preferably is conducted with the Perkin-Elmer Model 2380 Atomic Absorption Spectrophotometer, manufactured by the Perkin Elmer Corporation of Norwalk, Conn. National Bureau of Standards clay standards SRM 98a and 99a are used, and the test is conducted in substantial accordance with the manual for model 2380 entitled "Analytical Methods for Atomic Absorption Spectrophotometry."

In order to put the clay into solution for the atomic absorption analysis, a fusion method is used. In this method, the following steps are involved: 1. 0.1 grams of oven dried clay (moisture content less than 0.1 weight percent) are placed into a 25 milliliter platinum crucible with its cover. 0.5 grams of lithium metaborate are added to the clay and mixed with it with a small glass or polypropylene rod until the mixture is relatively homogeneous. Thereafter, the mixture is fused at 1,000 degrees centigrade for from about 10 to 15 minutes. 2. The crucible is then removed from the oven and allowed to air cool to below red heat. The bottom of the crucible is then quenched in distilled water. The fusion is inspected to insure there are no signs of pieces of fired clay and that the entire mass is clear. 3. The crucible is then placed in a 100 milliliter tall beaker. To this is added 60 milliliters of hot water, the magnetic stirring bar is dropped in, and stirring is begun. Either 2 milliliters of nitric acid or 5 milliliters of concentrated hydrochloric acid is added. If nitric acid is used, the solution will remain clear. If hydrochloric acid is used, the solution may have a slightly yellow color. 4. The placement of the magnetic stirring bar may have to be altered several times to effect dissolution of the fusion in the side of the crucible. Dissolution should be complete in about 15 minutes.

The clay used in the process of applicant's invention is comprised of from about 24 to about 45 weight percent of alumina, by dry weight of clay. As is known to those skilled in the art, alumina is an aluminum oxide of the formula $Al_2O_3$.

The amount of alumina in the clay may be determined by the atomic absorption analysis technique described with regard to silica analysis.

By comparison, the ball clay most commonly used in casting slips contains from about 20 to about 35 weight percent of alumina.

The clay used in the process of applicant's invention may (but need not) also contain from about 0.1 to about 1.5 weight percent of ferric oxide ($Fe_2O_3$) and/or from about 1 to about 4 weight of titanium dioxide ($TiO_2$) and/or from about 0.01 weight percent of magnesium oxide (MgO) and/or from about 0.1 to about 1.0 weight percent of calcium oxide (CaO) and/or from about 0.01 to about 1.0 weight percent of potassium oxide ($K_2O$) and/or from about 0.01 to about 1.0 weight percent of sodium oxide ($Na_2O$). The presence of these oxides may be determined by the atomic absorption analysis method described elsewhere in this specification.

The clay initially used in the process of this invention contains from about 45 to about 98 weight percent of kaolinite, by weight of dry clay. As is known to those skilled in the art, the term kaolinite refers to a clay mineral with the composition $Al_2O_3.2SiO_2.2H_2O$. See, e.g., pages 45-61 of Ralph E. Grim's "Clay Mineralogy" (McGraw-Hill Book Company, New York, 1953), the disclosure of which is hereby incorporated by reference into this specification.

The amount of kaolinite in the clay may be determined by rational analysis using the Mica Convention. When reference is made in this specification to one or more minerals in the clay, it is to be understood that said concentration is determined by rational analysis using the Mica Convention. This method is well known to those skilled in the art and is described in (1) Holdridge, D. A., "The Mineralogy of Some American (U.S.) Ball Clays," Trans. Brit. Ceram. Soc., V. 62, 857-75, 1963; (2) R. A. Heindl et al., "Kaolins: Effect of Firing Temperatures on Some of Their Physical Properties," B. Stds. J. Res. V. 8, 199-215, 1932; (3) F. H. Norton, "Fine Ceramics: Technology and Applications," Chapters 4 and 5 (McGraw-Hill Inc., New York, 1970); (4) G. W. Phelps, "A Note on Casting Properties of English China Clays," Am. Ceram. Soc. Bull., V. 38, pp.

411-414, 1959; (5) G. W. Phelps, "The Role of Organic Matter in Slip Casting" American Ceramic Society Bulletin, V. 29, pp. 55-58(1950); (6) A Dinsdale and W. T. Wilkinson, "Mechanical Properties of Whiteware," Proc. Brit. Cerm. Soc., No. 6, 119-136 (1966); and (7) G. W. Phelps et al., "Rheology and Rheometry of Clay-Water Systems," (Cyprus Industrial Minerals Company, Sandersville, Ga., 1982), pages 195-198.

The clay initially used in the process of this invention contains from about 0.5 to about 3.0 weight percent of mica, by weight of dry clay. As used in this specification, the term mica means muscovite mica, pargonite mica, sericite mica, and mixtures thereof. See, e.g., pages 196-197 of G. W. Phelps' "Rheology and Rheometry of Clay-Water Systems," supra, the disclosure of which is hereby incorporated by reference into this specification.

The clay initially used in the process of this invention contains from about 0.5 to 3 weight percent of montmorillonite. As is known to those skilled in the art, montmorillonite is a magnesian clay mineral with the approximate composition $5Al_2O_3.2MgO.24SiO_2.6H_2O$ in which some of the hydrogen ions are replaced by sodium ions or calcium ions. See, e.g., page 196 of Phelps' "Rheology and Rheometry of Clay-Water Systems," supra.

The clay initially used in the process of this invention contains from about 0.2 to about 6 weight percent of quartz. As is known to those skilled in the art, quartz is the common form of silica. It will be appreciated by those skilled in the art that the silica referred to in another portion of this specification is chemically combined, whereas the silica present as quartz is not so chemically combined.

In order to make the slurry of this invention, it is preferred to make the clay initially used into a clay/water slurry and, thereafter, to blend this slurry with a specified ball clay slurry.

In the first step of the process of this invention, the aforementioned clay is made into a clay/water slurry with a solids content of from about 60 to about 75 weight percent (by total weight of slurry, on dry weight of clay) and a organic polyelectrolyte content of from about 0.01 to about 1.0 weight percent, by weight of active ingredients in the polyelectrolyte.

The organic polyelectrolyte used to make the clay/water slurry is described at columns 23, 24, and 25 applicant's U.S. Pat. No. 4,812,427, the disclosure of which is hereby incorporated by reference into this specification. In general, this organic polyelectrolyte has a molecular weight of from about 1,400 to about 6,000.

The concentration of the organic polyelectrolyte (0.01 to 1.0 weight percent) is calculated on the weight of the active ingredient in the polyelectrolyte by the weight of the dry clay in the slurry.

In one preferred embodiment, the organic polyelectrolyte used in a polyacrylate resin. These reins are well known to those skilled in the art. Some preferred examples of these compositions are polymers of acrylic acid represented by the repeating group:

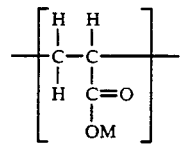

wherein M is selected from the group consisting of hydrogen, sodium, potassium, and ammonium. It is preferred that M be selected from the group consisting of sodium and ammonium. Suitable polycarboxylates include "DARVAN 811" (a polyacrylate sold by the R. T. Vanderbilt Company), "ALCOSPERSE 144" (a sodium polyacrylate sold by the Alco Chemical Corporation of Chattanooga, Tenn.), "COLLOID 102" (a liquid sodium polyacrylate with a solids content of 43 percent sold by the Alco Chemical Corporation), and the like.

It is preferred, in the process of this invention, to make at least two clay/water slurries and to thereafter combine them into one slurry. Thus, one may prepare a slurry of the aforementioned clay and combine it with a ball clay slurry. Thus, one may make three ball clay slurries, and one slurry of the aforementioned clay, and thereafter combine each of these slurries into one slurry. The goal is to provide one clay/water slurry with a specified particle size distribution, mineralogy, and set of properties.

In one preferred embodiment, a ball clay/water slurry is provided.

The ball clay/water slurry used in the process is described in U.S. Pat. No. 4,812,427, the disclosure of which is hereby incorporated by reference into this specification.

The ball clay/water slurry used in the process is sold under the name of "FLO-TECH"" by the H. C. Spinks Clay Company of Paris, Tenn. This slurry is well known to those in the art and is described, e.g., in a publication entitled "AN INTRODUCTION TO FLO-TECH" (H. C. Spinks Clay Company Inc., P.O. Box 820, Paris, Tenn. 38242).

The ball clay/water slurry preferably has a solids content of from about 58 to about 63 percent (by total weight of slurry) of ball clay (dry basis) and from about 42 to about 37 weight percent (by total weight of slurry) of water.

The ball clay/water slurry has an initial Brookfield 100 r.p.m. viscosity of from about 100 to about 600 centipoise. As is disclosed in column 13 of U.S. Pat. No. 4,812,427, the initial viscosity measurement may be made with a Brookfield Viscometer, model RVTD, equipped with a number 3 spindle and operated at 100 revolutions per minute.

The ball clay/water slurry has a particle size distribution such that from about 30 to about 45 percent (by weight of dry ball clay) of the particles in the ball clay slurry are smaller than 0.5 microns, from about 53 to about 69 percent of the ball clay particles are smaller than 2 microns, and from about 70 to about 85 percent of the ball clay particles are smaller than 5 microns.

The ball clay/water slurry has a specific surface area of from about 16 to about 21 square meters per gram.

When the slurry is freshly made, it has a five-minute gel viscosity at 0.5 revolutions per minute of from about 1,000 to about 10,000 centipoise, a ten-minute gel viscosity of from about 2,200 to about 12,000 centipoise, and a twenty-minute gel viscosity of from about 3,500 to about 14,000 centipoise.

In the ball clay/water slurry, the difference between the twenty-minute gel viscosity and its ten-minute gel viscosity is less than about 3,000 centipoise. The difference between the twenty-minute gel viscosity and the five-minute gel viscosity is less than about 4,000 centipoise. Means for measuring the gel viscosity of the slurry are described at columns 13 and 14 of U.S. Pat. No. 4,812,427, the entire disclosure of which is hereby incorporated by reference into this specification.

The ball clay/water slurry contains from about 0.01 to about 1.0 percent of organic polyelectrolyte (weight of active ingredient, by weight of dry ball clay). The organic polyelectrolyte preferably has a molecular weight of from about 1,400 to about 6,000.

The ball clay slurry preferably contains from about 50 to about 650 parts per million (by weight of dry ball clay) of soluble sulfate ion.

The ball clay/water slurry has a settling index of at least about 0.9, a flow index of from about 20 to about 30 seconds, a casting rate of from about 30 to about 60 grams after one hour, a transmission of at least about 60 percent, and a dry modulus of from about 550 to about 700 pounds per square inch. Means for determining each of these properties is described in U.S. Pat. No. 4,812,427, the disclosure of which is incorporated by reference into this specification.

The ball clay/water slurry contains from about 50 to about 65 weight percent (by dry weight of ball clay) of silica and from about 20 to about 35 weight percent of alumina. The silica/alumina ratio in the ball clay is from about 2.0 to about 3.0.

The ball clay/water slurry is blended with a slurry comprised of the clay initially described in this specification. The latter slurry is prepared in substantially the same manner as the ball clay/water slurries of U.S. Pat. No. 4,812,427.

FIG. 1 of U.S. Pat. No. 4,812,427 illustrates a process for preparing the ball clay/water slurries of Examples 1, 2, and 3 of said patent. The FIG. 1 of this patent is identical to the FIG. 1 of this patent application, and substantially the same process may be used to prepare a slurry of the clay initially described in this specification. There are only two major differences in the process. In the first place, a different clay is used. In the second case, there is no need to blend several slurries comprising such clay into one slurry. However, once the clay/water slurry is provided, it is then blended with the ball clay/water slurry made in accordance with U.S. Pat. No. 4,812,427.

Referring to FIG. 1, a clay from one or more of deposits 10, 12, 14, 16, or 18 is transferred via line 20 and tested in laboratory 22 to determine its composition. It is desired that the clay have the properties described elsewhere in this specification.

In one embodiment, the clay used is "Carroll Clay." This clay, which may be purchased from the H. C. Spinks Clay Company of Paris, Tenn., has a particle size distribution such that 97 percent of its particles are smaller than 20 microns, 96 perent of the particles are smaller than 10 microns, 91 percent of the particles are smaller than 5 microns, 76 percent of the particles are smaller than 2 microns, 59 percent of the particles are smaller than 1 microns, and 39 percent of the particles are smaller than 0.5 microns. The specific surface area of the clay is 18.19 square meters per gram. The clay contains 45.2 percent of silica, 37.9 percent of alumina, 2.31 percent of titania, and 94.55 percent of kaolinite, all by weight.

The analyses made of the clay in laboratory 22 include (1) chemical analyses, (2) rational analysis using the Mica Convention, (3) particle size distribution, (4) pH of the clay, (5) deflocculation potential, to determine how much deflocculant will bring the clay to minimum viscosity, (6) dry modulus of rupture of the clay, (7) fired color of the clay, determined by visual means, (8) percent drying shrinkage of the clay and percent firing shrinkage of the clay, and (9) other properties of the clay, such as its soluble sulfate content.

The soluble sulfate content of the clay preferably should be less than about 600 parts per million. The soluble sulfate content may be measured with A.S.T.M. test C-867-77. If the soluble sulfate content exceeds the amount required in the slurry, the sulfate content can be reduced by adding, e.g., barium carbonate in stoichiometric proportions.

Analysis of the clay prior to the time it is slurried allows one to determine, for any given set of properties, whether a given clay should be blended with one or more other clays to achieve a different mix of properties.

After being analyzed in laboratory 22, clay from one or more of deposits 20, 12, 14, 16, and/or 18 is charged via line 24 to one or more of storage sheds 26, 28, 30, 32, and 34, according to the specifications of earlier material already stored in the shed(s).

Thereafter, clay form one or more of the storage sheds 26, 28, 30, 32, and/or 34 is fed via line 36 to weigh hopper 38 and thence via line 40 to roller-crusher 42. Feeding means well known to those skilled in the art may be used to convey the clay from the storage shed.

The crusher 42 reduces the particle size of the clay so that substantially all of the particles in the clay are 1.5 inches or finer.

The clay from crusher 42 is fed via line 44 to blunger 46. As used in this specification, the term blunger refers to a cylindrical vessel containing a rotating shaft with fixed knives useful for blending or suspending ceramic material in liquid by deagglomeration and agitation.

In the process of this invention, hot water, organic polyelectrolyte, sulfate adjusting agent (if needed), pH adjusting agent (if needed), and other desired chemical additives are added to blunger 46 via line 45. It is preferred that these reagents be fed into the blunger in a certain sequence. The organic polyelectrolyte used in the process is preferably not fed into the blunger until at least about 50 weight percent of the clay has been fed into the blunger. Furthermore, if the soluble sulfate ion content of the clay is too high, it is preferred that the organic polyelectrolyte not be fed into the blunger 46 until the soluble sulfate ion concentration has been reduced to the required level.

A sufficient amount of water is fed into blunger 46 via line 45 so that, when the water has been mixed with all of the clay from hopper 38, a clay/water slurry with the required solids content will be produced. It is preferred that the water be hot, at a temperature of from about 140 to about 200 degrees Fahrenheit. It is even more preferred that the water be at a temperature of from about 150 to about 190 degrees Fahrenheit.

If the clay used in the process contains more than about 700 parts per million of soluble sulfate ion, then the clay should be mixed with a sulfate reducing agent prior to the time the polyelectrolyte is added. The sulfate reducing agents which may be added include, e.g., barium carbonate, barium monohydrate, barium octahydrate, mixtures thereof, and the like. The amount of sulfate reducing agent required may be determined by stoichiometric calculation.

The clay from crusher 42 is fed into blunger 46 over a period of from about 25 to about 120 minutes. It is preferred to feed the clay into the blunger over a period of from about 35 to about 90 minutes.

In one embodiment, organic polyelectrolyte is fed into blunger 46 only after two things have occurred: (1) at least about 50 weight percent of the clay from hopper 38 has been fed into blunger 46, and (2) the mixture in blunger 46 becomes too viscous to effectively agitate.

During blunging, clay/water mixture from the bottom of blunger 46 is fed via line 52 to Gorator 54, to the in-line viscometer 56, and then returned to blunger 46. As is known to those skilled in the art, the Gorator is a grinding apparatus manufactured by Dorr-Oliver Company of Stamford, Conn. Its function is to reduce the size of any lump in the slurry. The in-line viscometer is a single-speed viscometer manufactured by Brookfield Engineering Company of Staughton, Mass. Its function is to continuously monitor the viscosity of the slurry in blunger 46.

When the viscosity of the mixture in blunger 46 exceeds about 8,000 centipoise, then organic polyelectrolyte is added to the blunger, condition (2) having occurred; this addition reduces the viscosity, and blunging and/or clay addition is continued until the viscosity again exceeds about 8,000 centipoise. The process is continued until all of the clay has been blunged and the final viscosity of the mixture is about 200 centipoise or less at about 65 weight percent of solids.

If the Gallenkamp Build-up is too high, and/or the Brookfield viscosity at 100 r.p.m. is too high, more organic polyelectrolyte is added to the slurry.

As is disclosed in column 13 of U.S. Pat. No. 4,812,427, the Gallenkamp Build-up test is preferably conducted on a Gallenkamp Universal Torsion Viscometer. It is preferred that the Gallenkamp Build-up of said slurry be from about 30 to about 60 degrees.

The Brookfield viscosity at 100 revolutions per minutes should be less than about 1,000 centipoise.

When the slurry in blunger 46 has the desired viscosity, solids content, and Gallenkamp Build-up, as measured in laboratory 50, it is discharged via line 58 to scalper screen 60.

Scalper screen 60 is a 30 mesh screen which removes oversized particles. Other suitable screens can be used to remove particles greater than about 600 microns. These oversize particles, which may contain substantial portions of clay minerals, may be recycled via line 62 to blunger 46 for reagitation.

Slurry passing through scalper screen 60 is passed via line 64 to finishing screen 66. Finishing screen 66 is a 94 mesh screen which removes all oversize particles. This oversize material usually contains coarse articles of undesirable sand and lignite, which material is transferred via line 68 to dump 70 for disposal.

Although only one scalper screen 60 and only one finishing screen 66 are shown in the FIG. 1, a multiplicity of one or both of such screens may be used. Thus, in one embodiment, two scalper screens 60 and five finishing screens 66 are used.

The slurry which passes through finishing screen 66 is fed via line 72 into surge tank 74. Samples of this slurry may be taken via line 76 to laboratory 78 for evaluation of specific properties. The slurry properties which may be evaluated at this point include, for example:

a. Specific gravity—The specific gravity of the slurry should be from about 1.555 to about 1.796.

b. Gallenkamp Build-up—It is preferred that the build-up be from about 9 to about 110 degrees. It is more preferred that the build-up be from about 40 to about 70 degrees.

c. Casting rate—The casting rates should be from about 40 to about 150 grams in one hour and, preferably, from about 80 to about 110 grams in one hour. The casting rate of the slurry is determined by a test in which the slurry to be tested is first adjusted to its minimum viscosity. Portions of the "Colloid 211" polyacrylate dispersing agent are added to the slurry until its viscosity, as indicated by its Gallenkamp viscosity, is at a minimum (as indicated by three separate readings of such minimum viscosity). The slurry at minimum viscosity is then tested for casting rate in a test in which a 200 cubic centimeter slurry, at a solids content of 65 dry weight percent of slurry, is filter pressed through a Whatman 2.5 micron No. 5 filter paper with 98 percent retention above 2.5 microns in an NL Baroid Series 300 Standard API Filter Press (manufactured by NL Industries of Houston, Tex.) at 90 pounds per square inch for 60 minutes, the filter press is then drained for five minutes, and the filter cake is then weighed. The casting rate is equal to the number of grams (wet weight) in the filter cake after 60 minutes.

The slurry from surge tank 74 is passed via line 80 through electromagnetic filter 82 to remove magnetic particles from the slurry. The slurry is then passed through line 84 to one of agitated storage tanks 86, 88, and 90.

The slurry in agitated storage tanks 86, 88, and 90 may then be evaluated to determine its particle distribution and/or specific surface area and/or pH and/or soluble sulfate ion concentration. Other slurry properties also may be measured at this time.

Different slurries with different properties can be blended at this point. For example, a single clay from storage shed 18 may be used to make different slurries which are placed, e.g., in slurry tanks 86, 88, and 90. Based upon the properties of these different slurries, and the properties desired in the final slurry, two or more of these different slurries may be blended via line 96 and a volumetric pump (not shown) in final storage tank.

By way of illustration, the particle size distribution of each of the slurries (percent particles finer than, "CPFT", at 5 microns, 2 microns, and 0.5 microns) and the specific surface area, may be determined for each slurry. Using these data, and the data from laboratory 78, in a linear optimization program, the final properties of the blended slurry may be predicted. The final slurry may then be blended from tanks 86, 88, and 90 and passed via line 96 into final slurry tank 98. Final evaluation of all pertinent properties may then be determined in laboratory 102. Furthermore, tests regarding particle stability, rheological stability, and polymer properties of the slurry may then again be made.

The slurry made from the initial (Carroll) clay may be blended with a "FLO-TECH" slurry to produce the composition of this invention. Alternatively, or additionally, the former slurry may be blended with one or more of the ball clay slurries used to make the "FLO-TECH" slurry. Thus, for example, it may be blended with the slurry of Example 1 of U.S. Pat. No. 4,812,427 and/or the slurry of Example 2 of said patent and/or the slurry of Example 3 of said patent and/or the final "FLO-TECH" slurry. The identity and the number of slurries that the Carroll slurry is blended with will depend upon the properties desired in the final product.

Alternatively, or additionally, the Carroll slurry may be blended with one or more different dry clays.

The properties of the Carroll clay slurry, the nature of the ball clay slurry or slurries with which the Carroll clay slurry is blended, and the amount of Carroll clay slurry blended with the ball clay slurry are all carefully controlled to produce a blended Carroll clay/ball clay slurry with specified properties. Although applicant does not wish to be bound to any particular theory, he believes that the blended slurry properties described below are very important for the slurry's use in preparing a casting slip. It is further believed that slurries with properties outside of the recited ranges will be substantially inferior for use in preparing a casting slip.

The blending process is controlled in the manner described above so that the solids content of the slurry is from about 58 to about 72 percent (by total weight of slurry) of clay (dry basis).

The blending process is controlled so that the slurry has an initial viscosity of from about 90 to about 1,300 centipoise.

The particle size distribution of the slurry should be such that from about 25 to about 50 percent of the clay particles in the slurry are finer than 0.5 microns, from about 50 to about 80 percent of the clay particles are smaller than about 2.0 microns, and from about 70 to about 95 percent of the clay particles are smaller than 5 microns.

The specific surface area of the slurry should be from about 16 to about 30 square meters per gram.

The blended slurry, when freshly made, should have a five-minute gel viscosity at 0.5 revolutions per minute of from about 320 to about 26,000 centipoise.

The blended slurry, when freshly made, should have a ten-minute gel viscosity of from about 320 to about 26,000 centipoise.

The blended slurry, when freshly made, should have a twenty-minute gel viscosity of from about 320 to about 26,000 centipoise.

The difference between the twenty-minute gel viscosity of the slurry and its ten-minute gel viscosity should be less than about 3,000 centipoise.

The difference between the twenty-minute gel viscosity of the slurry and its five-minute gel viscosity should be less than about 4,000 centipoise.

The blended slurry should contain from about 0.01 to about 1.0 percent of organic polyelectrolyte (weight of active ingredient by weight of dry ball clay) wherein said organic polyelectrolyte has a molecular weight of from about 1,400 to about 6,000.

The blended slurry should contain from about 1 to about 650 parts per million (by weight of dry clay) of soluble sulfate ion.

The blended slurry should have a settling index of at least about 0.9. As is indicated in columns 14 and 15 of U.S. Pat. No. 4,812,427 (the disclosure of which is hereby incorporated by reference into this specification), the settling index test determines the extent to which the slurry will settle over a period of 10 days.

The blended slurry should have a flow index of from about 20 to about 30 seconds. This test is described in column 14 of U.S. Pat. No. 4,812,427.

The blended slurry should have a casting rate, at minimum initial Gallenkamp viscosity (see description presented above of this test) of from about 30 to about 200 grams at 90 p.s.i. for one hour.

The blended slurry should have a dry modulus of from about 200 to about 800 pounds per square inch.

The blended slurry should contain from about 45 to about 70 percent (by weight of dry clay) of silica and from about 20 to about 45 percent (by weight of dry clay) of alumina. The silica/alumina ratio in the clay slurry should be from about 1.0 to about 3.5.

The blended slurry of this invention is mineralogically different from the slurry described and claimed in U.S. Pat. No. 4,812,427. This difference results in a substantial difference in the behavior of the slurries when they are made into casting slips. When the slurry of this invention is combined with nonplastic material and made into a casting slip, the casting slip so formed has a casting rate which is substantially higher than the casting rate of the slip made by combining the slurry of U.S. Pat. No. 4,812,427 with the nonplastic material.

The blended slurry of this invention contains from about 55 to about 95 weight percent of kaolinite.

The blended slurry of this invention contains from about 5 to about 30 weight percent of quartz.

The blended slurry of this invention contains from about 0 to about 8 weight percent of Montmorillonite.

The blended slurry of this invention contains from about 0.5 to 8 weight percent of Mica.

By comparison, the "FLO-TECH" slurry currently being sold by the H. C. Spinks Clay Company Inc. of Paris, Tenn. typically contains 45.8 percent of kaolinite, 28.75 weight percent of quartz, 7.78 weight percent of Montmorillonite, and 10.82 weight percent of Mica. Although the concentrations of these clay minerals are not described in the Examples of U.S. Pat. No. 4,812,427, a "FLO-TECH" product is produced in the 4 of this patent which has a mineralogical content similar to that described above.

In the blended slurry of this invention, the ratio of the weight of the kaolinite to the weight of the Montmorillonite is at least about 11.

In the blended slurry of this invention, the ratio of the weight of the kaolinite to the weight of the Mica is at least about 8.5.

In the blended slurry of this invention, the ratio of the weight of the kaolinite to the weight of the Quartz is at least about 3.0.

The blended slurry of this invention may be used to make a porcelain casting slip. The casting slip is prepared by mixing slurry of this invention with nonplastic material. As is well known to those skilled in the art, the term "nonplastic" refers to potassium and sodium aluminosilicates and flint. Suitable nonplastics include, e.g., feldspar, nepheline syenite, feldspathic sands, flint, calcined clays, talc, pyrophyllite, and the like.

From about 40 to about 55 parts of the nonplastic material (dry weight, by total weight of dry material in the slip) are mixed with the blended slurry of this invention to provide a casting slip.

The following examples are presented to illustrate the claimed invention but are not to be deemed limitative thereof. Unless otherwise specified, all parts are by weight and all temperatures are in degrees Centigrade.

EXAMPLE 1

Preparation of a Carroll Clay Slurry 22,390 grams of the "Carroll Clay" sold by the H. C. Spinks Clay Company Inc. of Paris, Tenn. was used in this example. The clay contained 45.2 percent of silica, 37.9 percent of alumina, 0.35 weight percent of ferric oxide, 2.31 weight percent of titanium oxide, 0.02 percent of magnesium oxide, 0.04 weight percent of calcium oxide, 0.03 weight percent of potassium oxide, 0.06 weight percent of sodium oxide, 0.99 weight percent of Mica, 0.56 weight percent of Montmorillonite, 94.55 weight percent of Kaolinite, and 0.39 weight percent of quartz. The clay had a loss on ignition of 13.91 percent, it had a particle size distribution such that 97 of its particles were smaller than 20 microns, 96 percent of its particles were smaller than 10 microns, 91 percent of its particles were smaller than 5 microns, 75 percent of its particles were smaller than 2 microns, 59 percent of its particles were smaller than 1 micron, and 39 percent of its particles were smaller than 0.5 micron. The specific surface area of this clay was 18.19 square meters per gram.

The sample of the Carroll clay used in this Example contained 5.6 weight percent of moisture.

8,322 grams of water at a temperature of 150 degrees Fahrenheit were charged into a cylindrical, high-speed mixer. The Carroll clay was then slowly added to the water, with mixing, over a period of 300 minutes. During the mixing, portions of "COLLOID 211" polyacrylate resin (a liquid sodium polyacrylate with a solids content of 43 percent sld by the North Chemical Company of Marietta, Ga. were periodically added to the blunger when the viscosity of the slurry exceeded about 8,000 centipoise; however, no polyacrylate was added to the slurry until at least about 11,200 grams of the clay had been added to the water. At total of 33.33 grams of polyacrylate (by weight of active ingredient) was added during the mixing.

The slurry so produced was screened through an 80 mesh (177 micron) sieve.

EXAMPLE 2

36 parts of the slurry of Example 1 (by weight of dry clay in the slurry) were blended with 64 parts of "FLO-TECH" slurry (by weight of dry clay in the slurry) in a blunger; the "FLO-TECH" slurry was obtained from the H. C. Spinks Clay Company slurry contained 60.1 percent of silica, 24.1 percent of alumina, 1.02 percent of ferric oxide, 1.61 percent of titania, 0.28 percent of magnesium oxide, 0.1 percent of calcium oxide, 1.06 percent of potassium oxide, 0.15 percent of sodium oxide, 10.82 percent of Mica, 7.78 percent of Montmorillonite, 45.8 percent of kaolinite, 28.75 percent of quartz, all by weight. The slurry had a pH of 4.7, a dry modulus of ruputrue of 670 pounds per squre inch, and a specific surface area of 18 square meters per gram. These slurries were mixed for 20 minutes.

EXAMPLE 3

Preparation of Casting Slip 933 grams of the slurry of Example 3 (by weight of slurry) were mixed with 578 grams of flint (a 200 mesh flint obtained from Nick's Silica of Jackson, Tenn.) in a laboratory mixer; mixing occurred for 15 minutes.

The viscosity of the mixture thus produced was minimized by adding portions of the "COLLOID 211" polyacrylate to the mixture until its initial viscosity was minimized and three consecutive readings at this minimum viscosity were obtained. Thereafter, the casting rate of the slip was determined in a test in which a 200 cubic centimeter slurry, at a solids content of 76.3 percent, was filter pressed through a Whatman 2.5 micron No. 5 filter paper with 98 percent retention above 2.5 microns in an NL Baroid SEries 300 Standard API Filter Press (manufactured by NL Industries of Houston, Tex.) and 90 pounds per square inch for 30 minutes.

The filter cake was drained for five minutes and then weighed. 48.76 grams of the slurry of this Example were deposited on the filter cake.

COMPARATIVE EXAMPLE 4

The procedure of Example 3 was substantially repeated, with the exception that the slurry used was 100 percent "FLO-TECH," no Carroll clay slurry having been added.

Only 42.79 grams of the "FLO-TECH"/flint slip were deposited onto the filter cake.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A clay/water slurry comprised of from about 55 to about 95 weight percent of kaolinite, from about 5 to about 30 weight percent of quartz, less than about 8 weight percent of montmorillonite, and from about 0.5 to about 8 weight percent of mica, all weights calculated by dry weight of dry clay in the slurry wherein:
   (a) the ratio of the weight of said kaolinite to said montmorillonite in said slurry is at least about 11.0;
   (b) the ratio of the weight of said kaolinite to said mica in said slurry is at least about 8.5;
   (c) the ratio of the weight of said kaolinite to said quartz in said slurry is at least about 3.0;
   (d) said slurry contains from about 58 to about 72 percent (by total weight of slurry) of clay (dry weight);
   (e) said slurry has an initial Brookfield 100 r.p.m. viscosity of from about 90 to about 1,300 centipoise;
   (f) from about 25 to about 50 percent (by weight of dry clay) of the particles in said clay slurry are smaller than about 0.5 microns, from about 50 to about 80 percent of the clay slurry particles are smaller than about 2.0 microns, and from about 70 to about 95 percent of the clay slurry particles are smaller than about 5.0 microns;
   (g) said clay slurry has a specific surface area of from about 16 to about 30 square meters per gram;
   (h) said clay slurry, when freshly made, has a five-minute gel viscosity at 0.5 revolutions per minute of from about 320 to about 26,000 centipoise;
   (i) said clay slurry, when freshly made, has a ten-minute gel viscosity at 0.5 revolutions per minute of from about 320 to about 26,000 centipoise;
   (j) said clay slurry, when freshly made, has a twenty-minute gel viscosity at 0.5 revolutions per minute of from about 320 to about 26,000 centipoise;
   (k) the difference between the twenty-minute gel viscosity of the slurry and its ten-minute gel viscosity is less than about 3,000 centipoise;
   (l) the difference between the twenty-minute gel viscosity of the slurry and its five-minute gel viscosity is less than about 4,000 centipoise;
   (m) said slurry is comprised of from about 0.01 to about 1.0 percent of organic polyelectrolyte (weight of active ingredient, by weight of dry clay in the slurry), wherein said organic polyelectrolyte has a molecular weight of from about 1,400 to about 6,000;

(n) said slurry is comprised of from about 1 to about 650 parts per million (by dry weight of clay) of soluble sulfate ion;

(o) said slurry has a settling index of at least about 0.9;

(p) said slurry has a flow index of from about 20 to about 30 seconds;

(q) said slurry has a casting rate of from about 30 to about 200 grams at 90 p.s.i. for one hour;

(r) said slurry has a dry modulus of from about 200 to about 800 pounds per square inch;

(s) said slurry contains from about 45 to about 70 percent (by weight of dry clay) of silica and from about 20 to about 45 weight percent (by weight of dry clay) of alumina; and (t) the silica/alumina weight ratio in said clay slurry is from about 1.0 to about 3.5.

2. The slurry as recited in claim 1, wherein said organic polyelectrolyte is a polyacrylate.

3. A process for preparing a casting slip, comprising the steps of:

(a) providing the clay/water slurry recited in claim 1; and (b) mixing said clay/water slurry with from about 40 to about 55 parts (dry weight, by total weight of dry material in said slurry of nonplastic material.

4. The process as recited in claim 3, wherein said nonplastic material is selected from the group consisting of potassium aluminosilicate, sodium aluminosilicate, and flint.

5. The process as recited in claim 3, wherein said nonplastic is selected from the group consisting of feldspar, nepheline syenite, calcined clay, talc, and pyrophillite.

6. The process as recited in claim 5, wherein said organic polyelectrolyte is a polyacrylate.

* * * * *